(12) United States Patent
Roisen et al.

(10) Patent No.: US 9,550,454 B1
(45) Date of Patent: Jan. 24, 2017

(54) SYSTEMS AND METHODS FOR REMOVABLE VEHICLE SEAT SENSOR

(71) Applicants: Roger Roisen, Minnetrista, MN (US); Michael McHugh, Plymouth, MN (US); Ryan Borovansky, Ramsey, MN (US); Christian Wilcock, Ramsey, MN (US)

(72) Inventors: Roger Roisen, Minnetrista, MN (US); Michael McHugh, Plymouth, MN (US); Ryan Borovansky, Ramsey, MN (US); Christian Wilcock, Ramsey, MN (US)

(73) Assignee: Horse Sense Shoes, LLC, Plymouth, MN (US)

( * ) Notice: Subject to any disclaimer, the term of this patent is extended or adjusted under 35 U.S.C. 154(b) by 0 days.

(21) Appl. No.: 14/790,953

(22) Filed: Jul. 2, 2015

(51) Int. Cl.
*B60Q 9/00* (2006.01)
*G08B 21/02* (2006.01)

(52) U.S. Cl.
CPC ............. *B60Q 9/00* (2013.01); *G08B 21/0205* (2013.01); *G08B 21/0261* (2013.01)

(58) Field of Classification Search
CPC ... B60Q 9/00; G08B 21/0205; G08B 21/0213; G08B 21/0233; G08B 21/0216
See application file for complete search history.

(56) References Cited

U.S. PATENT DOCUMENTS

| | | | |
|---|---|---|---|
| 5,683,103 A | 11/1997 | Blackburn | |
| 6,330,501 B1 | 12/2001 | Breed et al. | |
| 6,922,147 B1 | 7/2005 | Viksnins et al. | |
| 9,139,128 B1 | 9/2015 | Lemons | |
| 2005/0121885 A1 | 6/2005 | Shieh | |
| 2008/0129482 A1 | 6/2008 | Seguchi et al. | |
| 2013/0106598 A1 | 5/2013 | Silveira | |
| 2015/0011160 A1* | 1/2015 | Jurgovan | H04B 5/0031 455/41.1 |
| 2016/0078737 A1* | 3/2016 | Cohen | G08B 21/0205 340/457 |

FOREIGN PATENT DOCUMENTS

RU 153000 U1 6/2015

OTHER PUBLICATIONS

"International Application Serial No. PCT/US2015/060903, International Search Report mailed Mar. 24, 2016", 2 pgs.
"International Application Serial No. PCT/US2015/060903, Written Opinion mailed Mar. 24, 2016", 4 pgs.
"Kinsa Smart Themometer", [online]. [archived on Aug. 10, 2015]. Retrieved from the Internet: <URL: https://web.archive.org/web/20150810055543/https://www.kinsahealth.com/, (2015), 6 pgs.
"Starfish Seat Sensor", [online]. © 2015 Studio Whale. [archived on Mar. 27, 2015], Retrieved from the Internet: <https://web.archive.org/web/20150327133607/http://studiowhale.com/products/starfish>, (2015), 3 pgs.

* cited by examiner

*Primary Examiner* — Curtis Odom
(74) *Attorney, Agent, or Firm* — Schwegman Lundberg & Woessner, P.A.

(57) ABSTRACT

Methods and systems for detection of removable vehicle seats may be used to indicate presence or absence of a child in the vehicle. In some examples, an alarm system includes a radio frequency (RF) transceiver and a removable seat magnetic coupling. Various actions are triggered when the parent (e.g., guardian) goes beyond a predefined range while the removable seat is within the vehicle, such as sounding an alarm on a mobile electronic device.

37 Claims, 7 Drawing Sheets

SYSTEMS AND METHODS FOR REMOVABLE VEHICLE SEAT SENSOR

BACKGROUND

Due to rapidly increasing temperatures within a locked vehicle, children left in vehicles run a high risk of heat exhaustion or death. Existing solutions for child detection rely on weight sensors, however these weight sensors require weight calibration.

SUMMARY

Methods and systems for detection of removable vehicle seats may be used to indicate presence or absence of a child in the vehicle. In some examples, an alarm system includes a radio frequency (RF) transceiver and a removable seat magnetic coupling. Various actions are triggered when the parent (e.g., guardian) goes beyond a predefined range while the removable seat is within the vehicle, such as sounding an alarm on a mobile electronic device.

DETAILED DESCRIPTION

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be used and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to specifically programmed modules, which are software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system.

Described herein are methods and systems for detecting and alerting a parent based on proximity to a child vehicle seat. The child vehicle seat system may include an enclosure containing a hardware occupancy sensor circuit, a controller circuit, and a radio frequency (RF) communication circuit. In some embodiments, the transmitter communicates with a mobile electronic device, detects proximity to the device, and causes the mobile electronic device to generate an abandonment alert.

Figure 1:
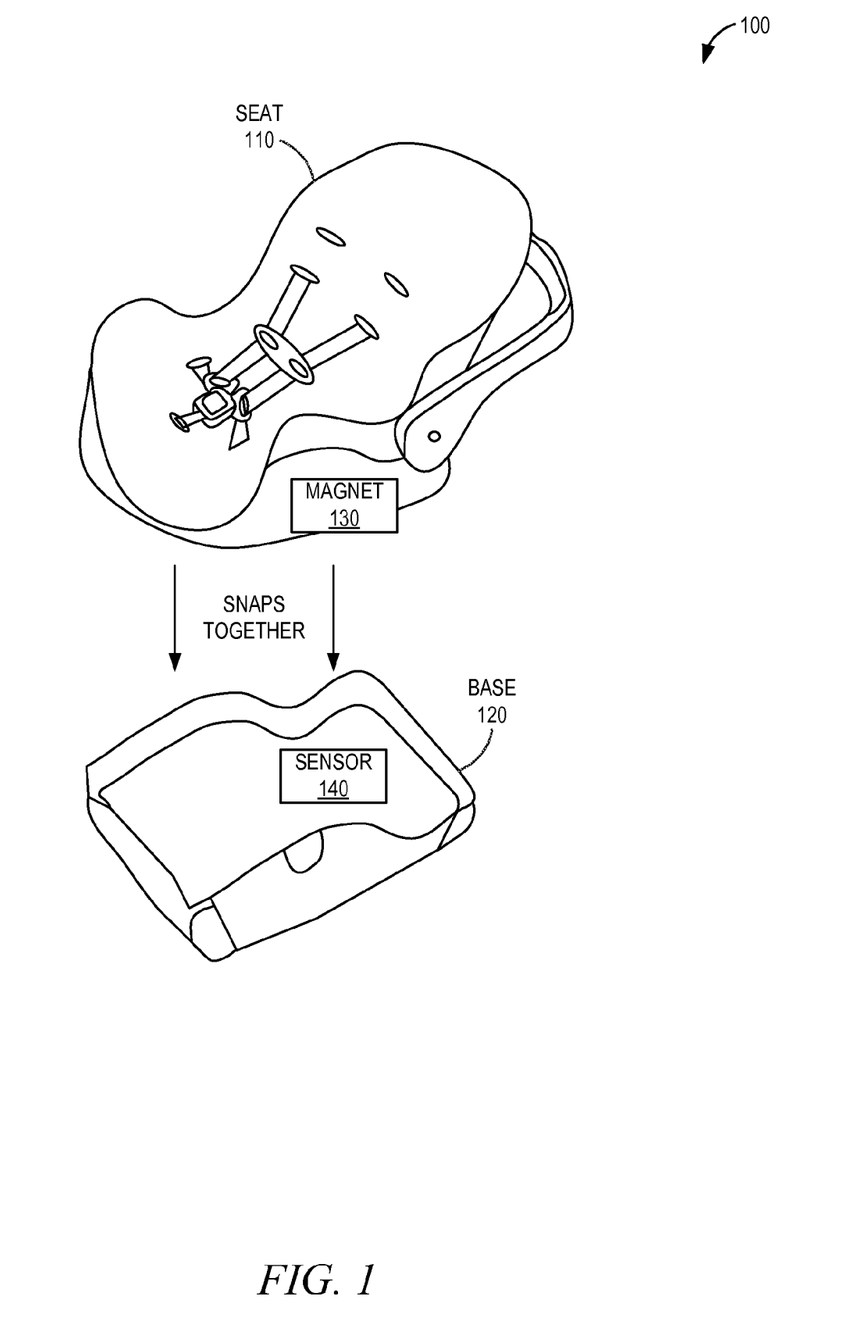
FIG. 1 is a perspective view of a removable vehicle seat detection system, according to some embodiments.

FIG. 1 is a perspective view of a removable vehicle seat detection system 100, according to some embodiments. System 100 may include a removable seat 110 and seat base 120. The base 120 may be installed in the vehicle and may remain in the vehicle. The removable seat 110 securely fastens to the base 120, and the seat 110 may be removed from the vehicle without removing a child from the seat 110. In some examples, the removable seat 110 may be removed from a vehicle and securely fastened to another base or to a stroller adapted to receive the seat 110. The seat 110 may include a magnetic element 130. Magnetic element 130 may be within the seat 110 as originally manufactured, or may be added to the seat 110 using adhesive, clips, or any attachment. Similarly, the base 120 may include a sensor device 140, where the sensor device 140 may be manufactured within the base 120 or may be attached to the base 120 using adhesive, clips, or any attachment.

When used in removable vehicle seats, such as those designed for children, the sensor device 140 may help determine if a child is within a vehicle. The sensor 140 may include a magnetic detection sensor, such as a Hall effect sensor that outputs a voltage in response to a magnetic field. The sensor 140 may generate a magnetic proximity distance to indicate an approximate distance between the magnet 130 and the sensor 140. The sensor 140 may generate a binary magnetic proximity signal to indicate whether the seat 110 is in sufficiently close proximity with the base 120, such as comparing a Hall effect sensor voltage against a minimum voltage threshold. In some examples, the seat 110 must be snapped into the base 120 before the sensor 140 provides a signal indicating the seat 110 is in sufficiently close proximity with the base 120. The magnetic proximity signal may be used to determine if the removable seat 110 has been separated from the base 120, which may be used by system 100 to infer that a child in seat 110 is no longer within the vehicle. In one embodiment, the sensor 140 may include a magnetic reed switch that opens when the seat 110 is removed from the base 120.

Though this application discusses proximity detection using a magnet 130 and sensor 140, other proximity sensors may be used. For example, the proximity sensor may include a capacitive sensor, Doppler effect sensor, eddy-current sensor, inductive sensor, laser rangefinder sensor, magnetic sensor, optical sensor, thermal infrared sensor, photocell sensor, radar sensor, ionizing radiation reflection sensor, sonar sensor, ultrasonic sensor, fiber optics sensor, or another proximity sensor.

Figure 2:
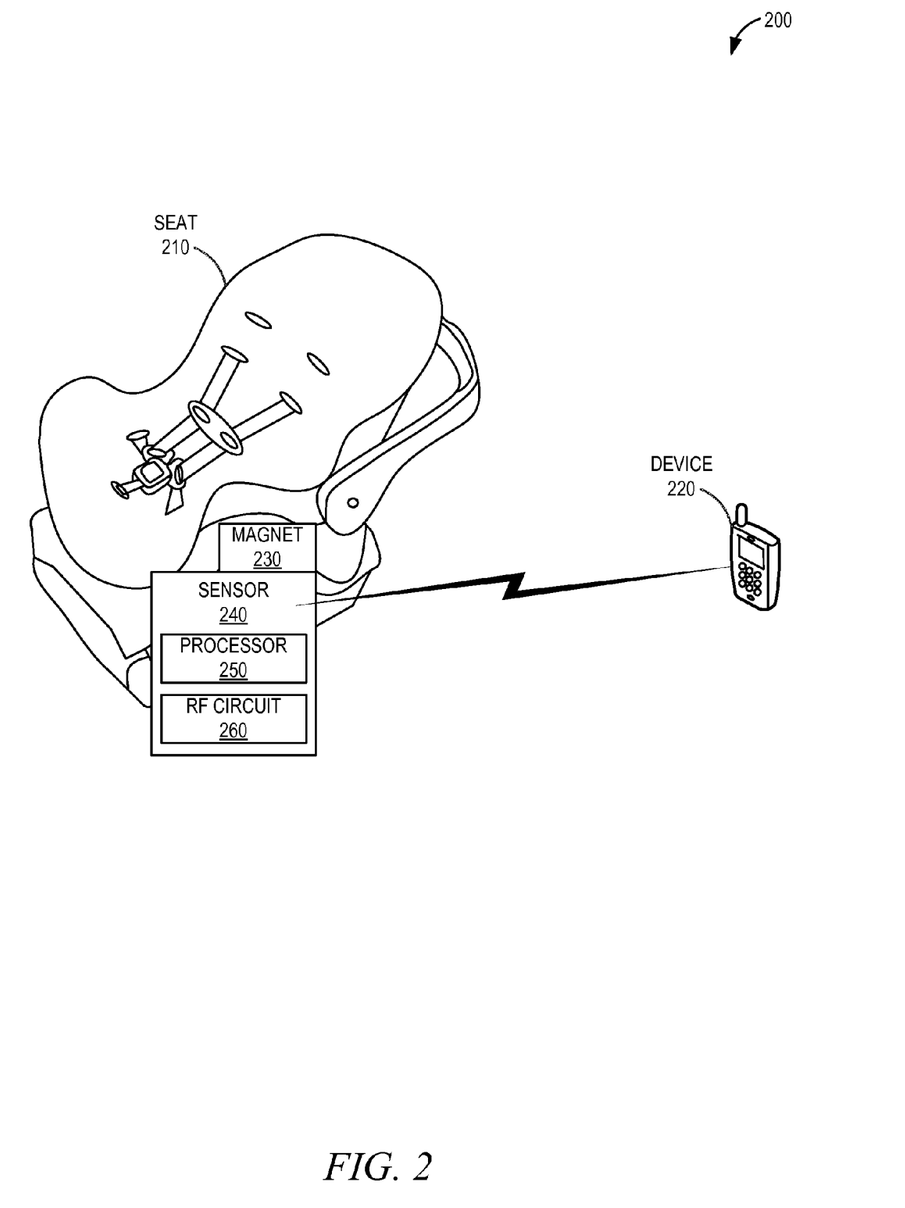
FIG. 2 is a perspective view of a removable seat detection and notification system, according to some embodiments.

FIG. 2 is a perspective view of a removable seat detection and notification system 200, according to some embodiments. System 200 includes a removable seat 210 and a mobile electronic device 220, such as a smartphone. The removable seat may include a magnet 230 and a sensor 240, and the sensor 240 may generate a magnetic proximity signal to indicate that the magnet 230 is in close proximity with the sensor 240. The sensor 240 includes a processor 250 and an RF communication circuit 260. In various examples, the sensor 240, via the RF circuit 260, transmits magnetic proximity signals to the mobile electronic device 220, to a vehicle computer system, or to another device. The RF circuit may transmit signals in accordance with a low power wireless transmission standard, such as Bluetooth Low Energy (BTLE), IEEE 802.15.1, IEEE 802.15.4, or other standards. The RF circuit 260 may be paired with one or more of the mobile electronic device 220 or with a vehicle to establish such communications.

In some embodiments, the sensor 240 receives a raw magnetic sensor measurement, interprets the raw measurement as an estimated distance or binary magnetic proximity signal, formats the interpreted data, and transmits the formatted data. For example, a raw magnetic sensor measurement may include a voltage level received from a Hall effect sensor, and the voltage level may be compared against a voltage threshold to generate a binary magnetic proximity signal indicating that the seat 210 is securely fastened within the vehicle. In other embodiments, the sensor 240 receives and transmits the raw measurement to the device 220, and the device 220 interprets the raw measurement. In still other embodiments, the sensor 240 receives and interprets the raw measurement, and transmits both the raw measurement and the interpreted measurement to the device 220. The raw and interpreted measurements may be received by the processor 250 and converted into a data format that is compatible with the target device, such as using a data format compatible with an application running on the mobile device 220 or a data format compatible with a vehicle computer system.

The magnetic proximity signal may be received by device 220, and an application running on device 220 may indicate whether the magnet 230 is in close proximity with the sensor 240. The magnetic proximity signal may be used to determine if the seat 210 is completely secured. For example, the application on device 220 may receive a binary magnetic proximity signal and present a computer-generated image a seat securely snapped into a seat base. In an example, device 220 or a vehicle computer system may also determine an apparent vehicle speed, and may use the received magnetic proximity signals to provide a warning if the seat is not completely secured while traveling above a vehicle speed threshold. For example, device 220 may receive a nonzero vehicle speed and a binary magnetic proximity signal indicating seat 210 is unfastened, and may generate an audible alarm, a vibrating alarm, and a flashing display to warn the user that seat 210 is unfastened.

Figure 3A:
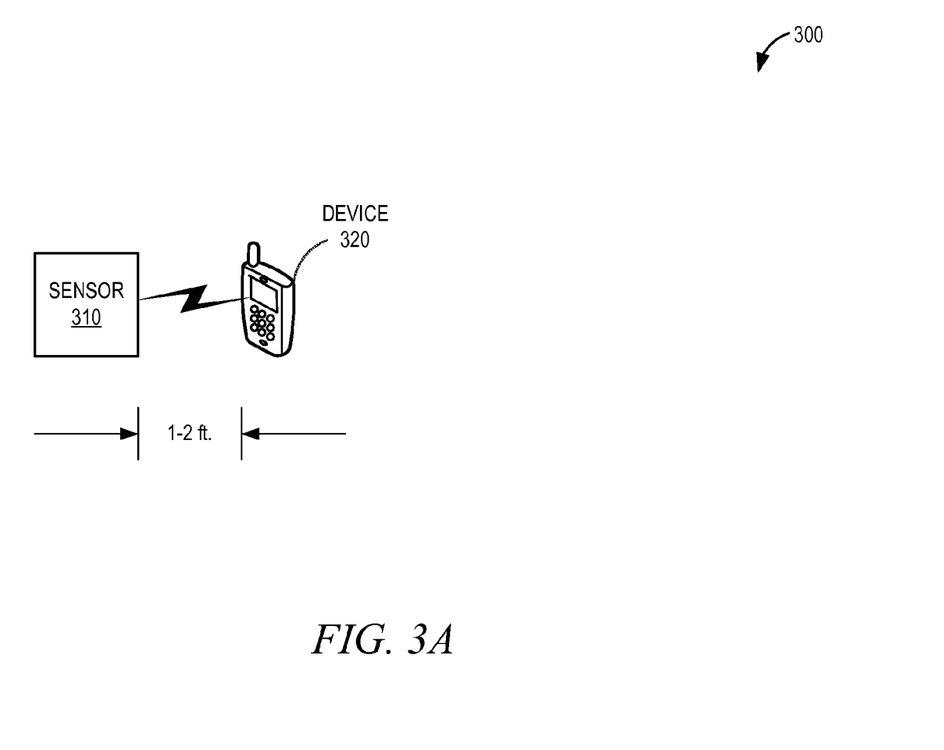
FIGS. 3A-3B are block diagrams of a sensor proximity detection and notification system, according to some embodiments.
Figure 3B:
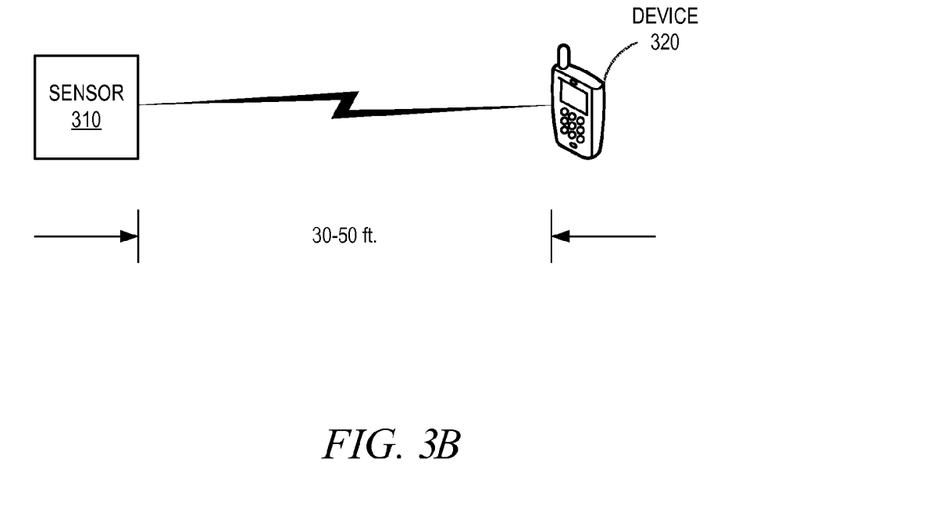

FIGS. 3A-3B are block diagrams of a sensor proximity detection and notification system 300, according to some embodiments. System 300 includes sensor 310 and device 320, where sensor 310 and device 320 may include proximity detection circuitry. FIG. 3A illustrates sensor 310 and device 320, where the proximity detection circuitry determines that the sensor 310 and the device 320 are separated by a distance of 1-2 feet. FIG. 3B illustrates sensor 310 and device 320, where the proximity detection circuitry determines that the sensor 310 and the device 320 are separated by a distance of 30-50 feet. Other distances may be used, and the distance may be extended in some embodiments using an RF power amplifier.

In some examples, the proximity detection circuitry includes an RF proximity sensor, and the RF proximity sensor may generate an RF proximity signal. The RF proximity sensor may generate the RF proximity signal based on a detected signal power, a received signal strength indicator (RSSI), or other RF signal characteristics. In some examples, presence or absence of an RF signal may be used alone or in combination with the RF proximity sensor to determine a binary RF proximity signal. In some examples, location information may be used to determine an RF proximity, such as using GPS information, cellular tower triangulation, Wi-Fi access point triangulation, or other location information. For example, a sensor GPS location may be provided by the vehicle in which the sensor 310 is installed, a device GPS location may be determined by device 320, and the location differences may be used to generate or improve accuracy of the RF proximity signal. In some examples, multiple radio or location sources may be combined to generate or improve distance determinations.

The RF proximity signal may include a binary RF proximity signal to indicate whether the sensor 310 is in sufficiently close proximity with the device 320. For example, if the RSSI value falls below an RSSI threshold or if the signal power falls below a signal power threshold, a binary RF proximity signal may be generated to indicate that the device 320 has abandoned (e.g., gone out of range of) the sensor 310. The RF proximity signal may include an approximate distance between the sensor 310 and the device 320. The approximate distance may be grouped into two or more ranges, such as the 1-2 foot range shown in FIG. 3A or the 30-50 foot range shown in FIG. 3B, and an RF proximity alert (e.g., alarm) may be generated when there is a transition from a first range to a second range. The approximate distance may be monitored continually for a range trend. For example, successive range measurements may indicate that the distance between device 320 and sensor 310 is increasing, which may indicate that the device 320 is moving away from the sensor 310, and a binary RF proximity signal may be generated to indicate that the device 320 has abandoned the sensor 310.

An RF proximity alert (e.g., alarm) may be generated to notify a user. The alert may include a visible alert, an audible alert, a tactile alert (e.g., vibration), a text or e-mail message, or other alert. In some examples, the device 320 may include a mobile device processor, where the processor is executing foreground or background software to generate a visible or audible alarm, and the device 320 may include speakers or other hardware or circuitry to generate the alarm. In some examples, the sensor 310 may generate an alarm either using internal alarm circuitry or by sending the alert to a vehicle alarm system. One or more alarms may be used in combination to increase the probability that a user is notified.

In some embodiments, the RF proximity detection circuitry operates unidirectionally, such as sensor 310 detecting an RF signal from device 320 and determining an RF proximity. This unidirectional operation may enable a proximity detection system where only a single proximity detection circuit is required. For example, the proximity detection circuit may be packaged and sold within the sensor 310, and it may operate with any device 320 that emits an RF signal that can be detected by the proximity detection circuit on the sensor 310. A unidirectional system may be used to generate a single alert on the device housing the proximity detection circuit, or may be used to generate and send a proximity alert from the proximity detection circuit device to another device. For example, when a range of 30-50 feet is detected by the sensor 310, the sensor 310 may send an alert to the device 320. In other embodiments, the proximity detection circuitry operates bidirectionally, and sensor 310 and device 320 may receive RF signals from each other and independently determine RF proximities. This bidirectional operation may enable independent detection of proximity or independent generation of proximity alerts.

Figure 4:
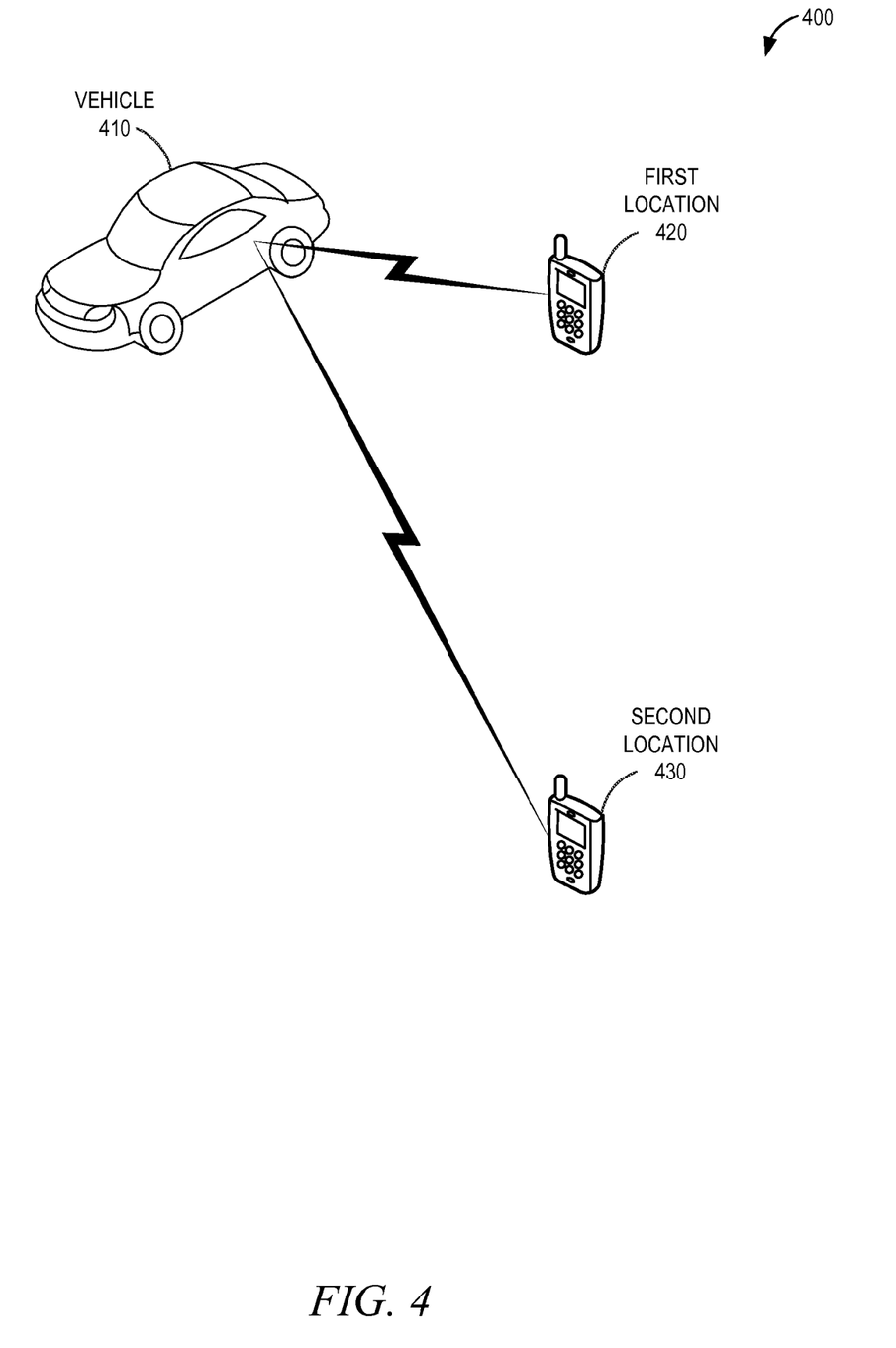
FIG. 4 is a perspective view of a removable seat detection and mobile notification system, according to some embodiments.

FIG. 4 is a perspective view of a removable seat detection and mobile notification system 400, according to some embodiments. System 400 includes a vehicle 410, where vehicle 410 may include the seat 110, base 120, magnet 130, and sensor 140 shown in FIG. 4. A magnetic proximity signal may be transmitted from vehicle 410 to a mobile electronic device, where the magnetic proximity signal indicates that a removable vehicle seat is within vehicle 410. The magnetic proximity signal may be received by the mobile electronic device at a first device location 420. The first device location 420 may be in close proximity to the vehicle, such as when a user first exits a vehicle. The magnetic proximity signal may also be received by the mobile electronic device at a second location 430, where the second location 430 is further from the vehicle 410 than the first location 420. If the device moves to a second location 430 while the magnetic proximity signal indicates the seat within the car, then an abandonment alert may be generated. In addition to the abandonment alert, system 400 may also alert a user of various combinations of proximities. For example, a minor vibration warning may be generated when a user first exits a vehicle, and a substantial abandonment alert may be generated if the user moves away from the vehicle while the removable seat is attached to the base.

System 400 may use various vehicle features. A vehicle alarm system may be used to notify the user, such as honking the horn or flashing lights to indicate an abandonment alert. A vehicle equipped with a roadside emergency service system may contact the service to request help or to initiate a phone call with an operator to determine if a child is within the vehicle. A vehicle may also provide an indication of vehicle speed or movement, and system 400 may enter a reduced power (e.g., sleep) mode when the vehicle is moving. A vehicle may provide an environmental response to an abandonment alert, such as opening car windows or turning on air conditioning. A vehicle may also provide an environmental input, such as temperature, humidity, or other environmental measurement, such as the environmental sensors shown in FIG. 5.

Figure 5:
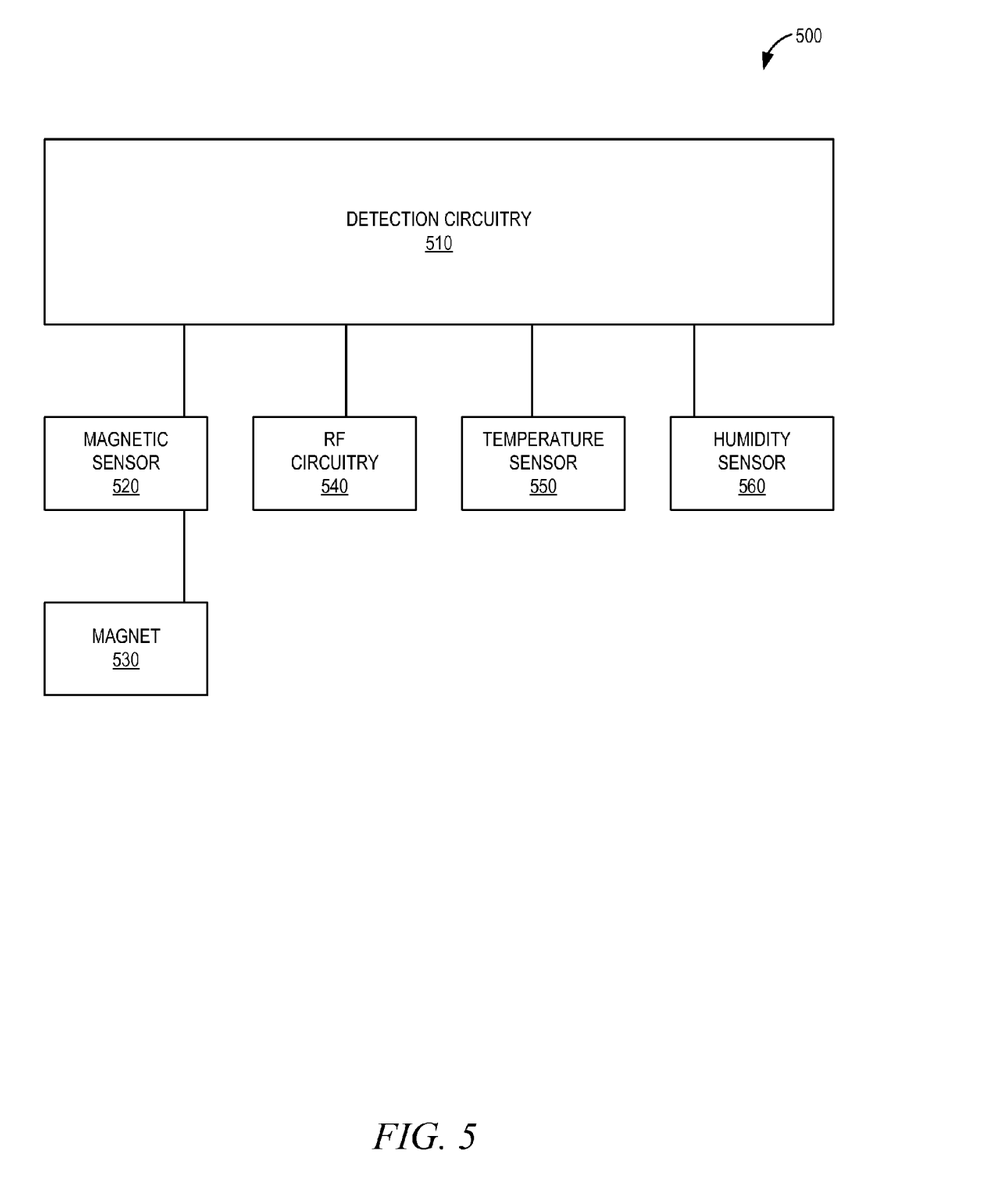
FIG. 5 is a block diagram of an example removable seat proximity detection system, according to some embodiments.

FIG. 5 is a block diagram of a removable seat proximity detection system 500, according to some embodiments. The system includes detection circuitry 510, where detection circuitry 510 may be a mobile device processor, a dedicated integrated circuit (IC), or other circuit. The detection circuitry 510 may receive magnetic proximity signals from a magnetic sensor 520, where the magnetic proximity signals indicate a magnetic proximity between the magnetic sensor 520 and a magnet 530. The detection circuitry 510 may receive RF proximity signals from RF circuitry 540, where the RF proximity signals indicate RF proximity between the RF proximity sensor 540 and an external mobile electronic device. The detection circuitry 510 may also use the RF circuitry 540 to communicate with the external mobile electronic device, including sending or receiving alerts or proximity information.

The detection circuitry 510 may also receive various other inputs, such as an input from a temperature sensor 550 or from a humidity sensor 560. The detection circuitry 510 may combine inputs from various sensors to generate various alerts. For example, detection circuitry 510 may use a magnetic sensor 520 input to determine that a removable vehicle seat is within a vehicle, and may warn a user when the temperature sensor 550 and humidity sensor 560 indicate an unsafe environment within a vehicle.

Components of the removable seat proximity detection system 500 may be implemented on two or more devices. In an example, a removable vehicle seat may be manufactured to include magnet 530, and a removable vehicle seat base may be manufactured to include the detection circuitry 510, magnetic sensor 520, RF circuitry 540, temperature sensor 550, and humidity sensor 560. In other embodiments, the RF circuitry 540, temperature sensor 550, or humidity sensor 560 may be implemented in a mobile electronic device, in a vehicle, or in another device.

Figure 6:
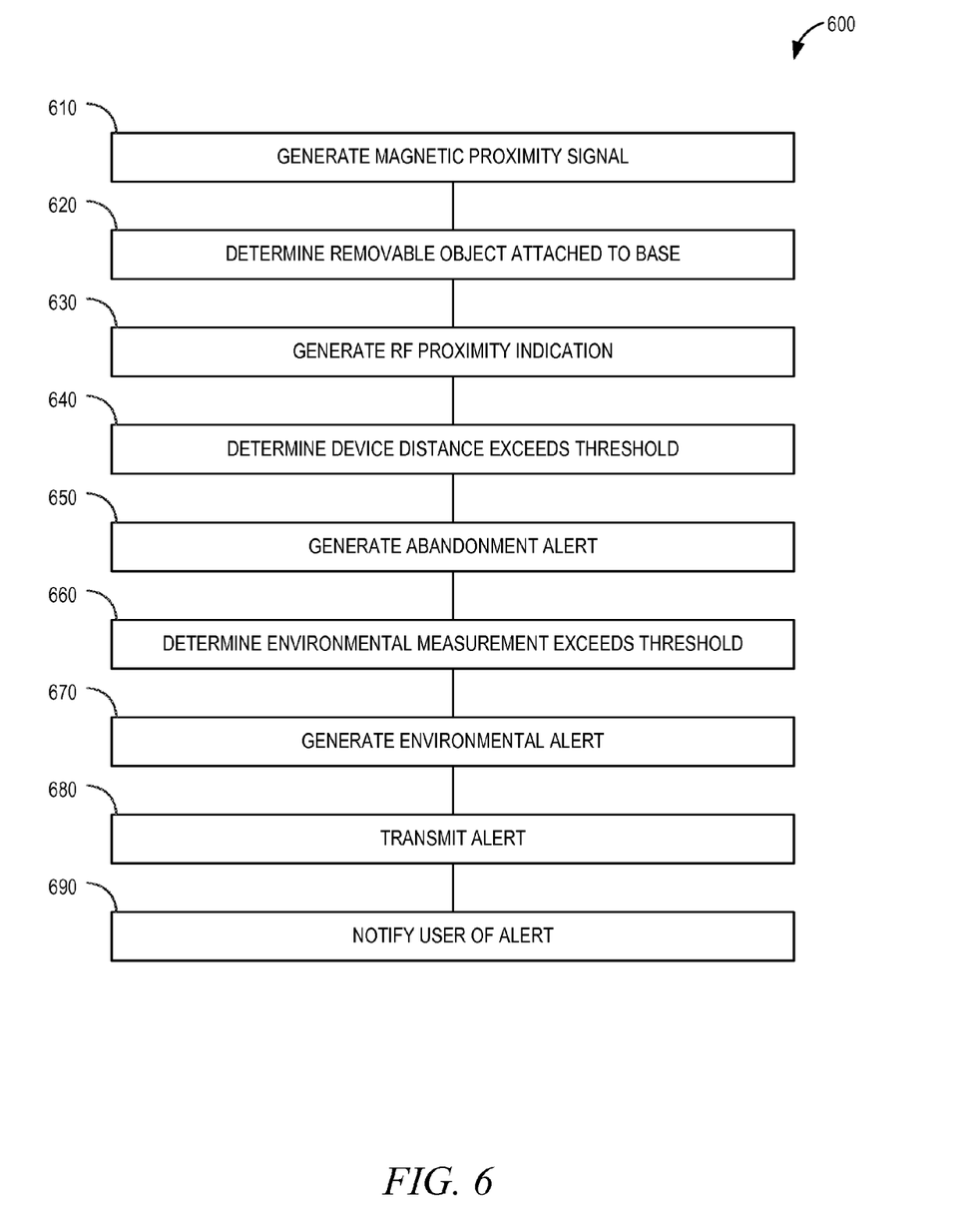
FIG. 6 is a flowchart of a removable vehicle seat detection method, according to some embodiments.

FIG. 6 is a flowchart of a removable vehicle seat detection method 600, according to some embodiments. Method 600 may be executed on a device processor that has been specifically programmed or designed to carry out method steps. Method 600 includes generating 610 a magnetic proximity signal. The magnetic proximity signal may include a voltage level generated by a Hall Effect sensor. The magnetic proximity signal is representative of a magnetic proximity between a magnetic sensor attached to a base and a magnet attached to a removable object. The removable object may be attached to and removed from the base, such as a removable vehicle seat. Based on the magnetic proximity signal, method 600 includes determining 620 that the removable object is attached to the base.

Method 600 includes generating 630 an RF proximity indication representative of a device distance between an RF circuit and a mobile electronic device. The RF proximity indication may be based on a detected signal power, a received signal strength indicator (RSSI), presence or absence of an RF signal, or other RF signal characteristics. In some examples, location information may be used to determine an RF proximity, such as using GPS information, cellular tower triangulation, Wi-Fi access point triangulation, or other location information. The RF proximity indication may be generated by an RF circuit. The RF circuit may be configured to communicate based on a wireless communication standard, wherein the wireless communication standard is based on at least one of a BTLE standard, an IEEE 802.15.1 standard, and an IEEE 802.15.4 standard. Based on the RF proximity indication, method 600 includes determining 640 that the device distance exceeds a maximum device distance threshold. Based on a combination of determining 620 that the removable object is attached to the base and determining 640 that the device distance exceeds a maximum device distance threshold, method 600 may generate 650 an abandonment alert.

Method 600 may include determining 660 that an environmental measurement exceeds a maximum environmental measurement safety threshold. The environmental measurement may be received by an environmental sensor. In some examples, the environmental measurement is at least one of a humidity measurement and a temperature measurement. Based on a combination of determining 620 that the removable object is attached to the base and determining 660 that an environmental measurement exceeds a maximum environmental measurement safety threshold, method 600 may generate 670 an environment alert.

Method 600 includes transmitting 680 an alert, where the alert may include at least one of the abandonment alert and the environment alert. The alert may be transmitted via an RF circuit to a mobile electronic device such as a smartphone, to a vehicle, or to another electronic device. Method 600 includes notifying 690 a user of the alert. In some examples, notifying 690 includes causing a mobile electronic device to flash, vibrate, play a sound, display a warning message, send a text or e-mail message, and other forms of notification. In some examples, notifying 690 includes causing a vehicle alarm system to honk a horn, flash vehicle lights, or provide other vehicular notification. Various forms of notification may be combined to increase the probability that a user is notified.

Figure 7:
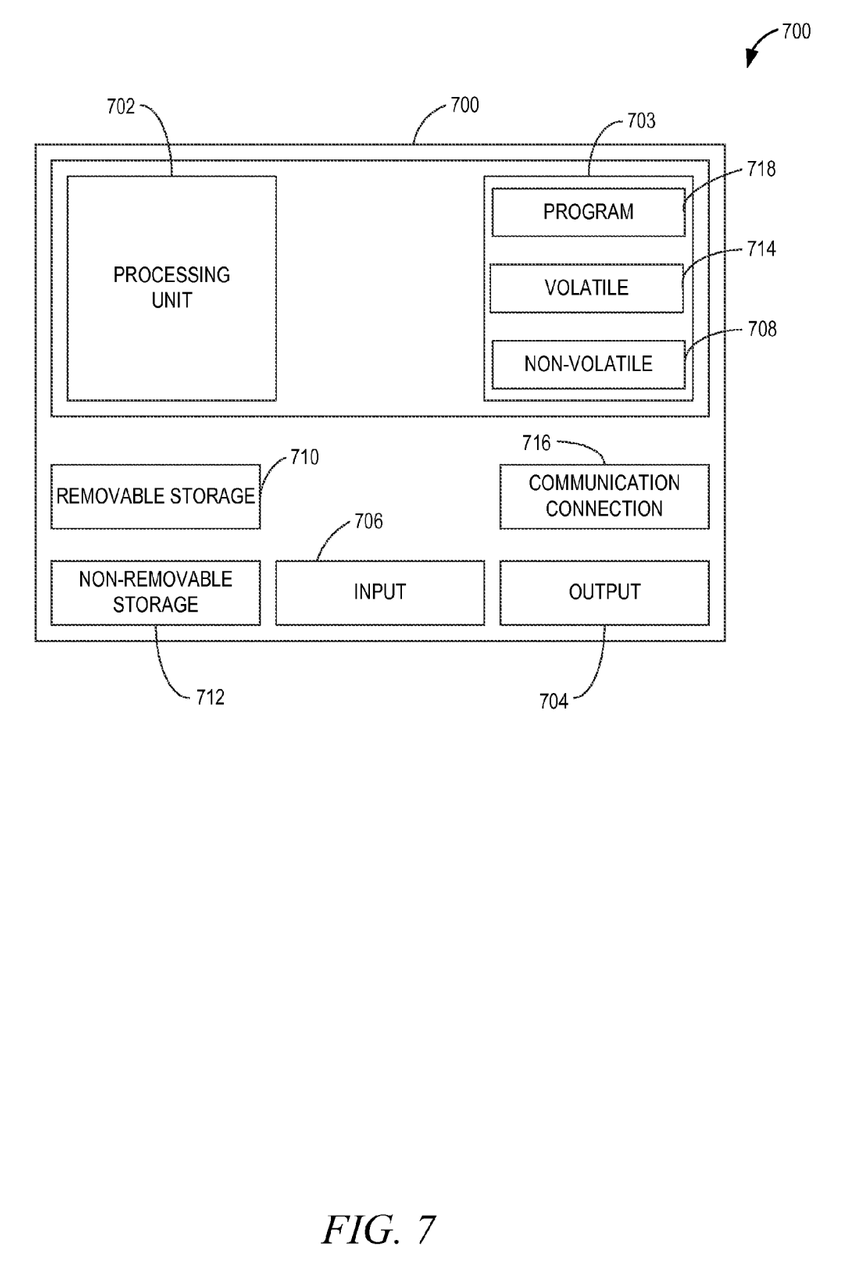
FIG. 7 is a block diagram of a computer system to implement removable seat detection system, according to some embodiments.

FIG. 7 is a block schematic diagram of a computer system 700 to implement removable seat detection system, according to some embodiments. The computer system 700 may use fewer components than shown in FIG. 7 in some embodiments to perform the methods described. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

The present disclosure supports several examples, including but not limited to the following:

Example 1 includes a removable object proximity detection system, the system comprising a magnet attached to a removable object, a magnetic sensor attached to a base, the magnetic sensor configured to generate a magnetic proximity signal representative of a magnetic proximity between the removable object and the base, the removable object configured to be removably attached to the base, a radio frequency (RF) circuit, the RF circuit configured to communicate with a mobile electronic device and to generate an RF proximity indication, the RF proximity indication representative of a device distance between the RF circuit and the mobile electronic device, and a device processor electrically coupled to the magnetic sensor and to the RF circuit, the device processor specifically programmed to receive the magnetic proximity signal from the magnetic sensor, determine, based on the magnetic proximity signal, that the removable object is attached to the base, receive the RF proximity indication from the RF circuit, determine, based on the RF proximity indication, that the device distance exceeds a maximum device distance threshold, and generate an abandonment alert, the alert indicating that the removable object is attached to the base and that the device distance exceeds the maximum device distance threshold.

Example 2 includes the system of example 1, wherein the device processor is further specifically programmed to transmit the abandonment alert to the mobile electronic device via the RF circuit.

Example 3 includes the system of example 1, further including an audible alert circuit, wherein the device processor is further specifically programmed to cause the audible alert circuit to generate an audible alert.

Example 4 includes the system of example 1, wherein the device processor is further specifically programmed to transmit the abandonment alert to a vehicle alarm system to generate a vehicle alarm.

Example 5 includes the system of example 1, wherein the RF proximity indication includes a received signal strength indicator (RSSI).

Example 6 includes the system of example 1, further including an environmental sensor, wherein the environmental sensor generates an environmental measurement representative of an environmental condition, and the device processor is further specifically programmed to receive the environmental measurement, determine that the environmental measurement exceeds a maximum environmental measurement safety threshold, and generate an environment alert, the alert indicating that the removable object is attached to the base and that the environmental condition is unsafe.

Example 7 includes the system of any of examples 1-6, wherein the environmental measurement is at least one of a humidity measurement and a temperature measurement.

Example 8 includes the system of example 1, wherein the RF circuit is further configured to communicate based on a wireless communication standard.

Example 9 includes the system of any of examples 1-8, wherein the wireless communication standard is based on at least one of a BTLE standard, an IEEE 802.15.1 standard, and an IEEE 802.15.4 standard.

Example 10 includes the system of example 1, wherein the magnetic sensor includes a Hall Effect sensor.

Example 11 includes the system of example 1, wherein the device processor is a microcontroller.

Example 12 includes a magnetic proximity detection system, the system comprising a mobile electronic device RF circuit, the RF circuit configured to communicate with a magnetic sensor and to generate an RF proximity indication, the RF proximity indication representative of a device distance between the RF circuit and the magnetic sensor, a mobile electronic device processor electrically coupled to the RF circuit, the mobile electronic device configured to execute software specifically programmed to receive a magnetic proximity signal from the magnetic sensor, the magnetic proximity signal representative of a magnetic proximity between a magnet and the magnetic sensor, determine, based on the magnetic proximity signal, that the magnet is in close proximity to the magnetic sensor, receive the RF proximity indication from the RF circuit, determine, based on the RF proximity indication, that the device distance exceeds a maximum device distance threshold, and generate an abandonment alert, the alert indicating that the magnet is in close proximity to the magnetic sensor and that the device distance exceeds the maximum device distance threshold.

Example 13 includes the system of example 12, further including an audible signal generation circuit, wherein the mobile electronic device processor software is further specifically programmed to cause the audible signal generation circuit to generate an audible alert.

Example 14 includes the system of example 12, wherein the mobile electronic device processor software is further specifically programmed to transmit the abandonment alert to a vehicle alarm system to generate a vehicle alarm.

Example 15 includes the system of example 12, wherein the RF proximity indication includes a received signal strength indicator (RSSI).

Example 16 includes the system of example 12, wherein the mobile electronic device software is further specifically programmed to receive an environmental measurement representative of an environmental condition, determine that the environmental measurement exceeds a maximum environmental measurement safety threshold, and generate an environment alert, the alert indicating that the magnet is in close proximity to the magnetic sensor and that the environmental condition is unsafe.

Example 17 includes the system of any of examples 12-16, wherein the environmental measurement is at least one of a humidity measurement and a temperature measurement.

Example 18 includes the system of example 12, wherein the RF circuit is further configured to communicate based on a wireless communication standard.

Example 19 includes the system of any of examples 12-18, wherein the wireless communication standard is based on at least one of a BTLE standard, an IEEE 802.15.1 standard, and an IEEE 802.15.4 standard.

Example 20 includes the system of example 12, wherein the magnetic sensor includes a Hall Effect sensor.

Example 2121 includes a method for removable object proximity detection executing on a specifically programmed device processor, the method including generating a magnetic proximity signal representative of a magnetic proximity between a magnetic sensor attached to a base and a magnet attached to a removable object, the removable object configured to be removably attached to the base, determining, based on the magnetic proximity signal, that the removable object is attached to the base, generating an RF proximity indication representative of a device distance between an RF circuit and a mobile electronic device, determining, based on the RF proximity indication, that the device distance exceeds a maximum device distance threshold, and generating an abandonment alert, the alert indicating that the removable object is attached to the base and that the device distance exceeds the maximum device distance threshold.

Example 22 includes the method of example 21, further including transmitting the abandonment alert to the mobile electronic device via the RF circuit.

Example 23 includes the method of example 21, further including generating an audible alert via an audible alert circuit.

Example 24 includes the method of example 21, further including transmitting the abandonment alert to a vehicle alarm system to generate a vehicle alarm.

Example 25 includes the method of example 21, wherein the RF proximity indication includes a received signal strength indicator (RSSI).

Example 26 includes the method of example 21, further including generating an environmental measurement representative of an environmental condition via an environmental sensor, determining that the environmental measurement exceeds a maximum environmental measurement safety threshold, and generating an environment alert, the alert indicating that the removable object is attached to the base and that the environmental condition is unsafe.

Example 27 includes the method of any of examples 21-27, wherein the environmental measurement is at least one of a humidity measurement and a temperature measurement.

Example 28 includes the method of example 21, wherein the RF circuit is configured to communicate based on a wireless communication standard.

Example 29 includes the method of any of examples 21-29, wherein the wireless communication standard is based on at least one of a BTLE standard, an IEEE 802.15.1 standard, and an IEEE 802.15.4 standard.

Example 30 includes the method of example 21, wherein the magnetic sensor includes a Hall Effect sensor.

Example 3131 includes a removable object proximity detection system, the system comprising a magnet attached to a removable object, a magnetic sensor attached to a base, the magnetic sensor configured to provide an attachment signal representative of an attachment of the removable object to the base, a radio frequency (RF) circuit, the RF circuit configured to communicate with a mobile electronic device and to generate an RF proximity indication, the RF proximity indication representative of a device distance between the RF circuit and the mobile electronic device.

Example 32 includes the system of example 31, further including a device processor electrically coupled to the magnetic sensor, the device processor specifically programmed to receive the attachment signal from the magnetic sensor, determine, based on the attachment signal, that the removable object is attached to the base, receive the RF proximity indication from the RF circuit, determine, based on the RF proximity indication, that the device distance exceeds a maximum device distance threshold, and generate an abandonment alert, the alert indicating that the removable object is attached to the base and that the device distance exceeds the maximum device distance threshold.

Example 33 includes the system of example 31 wherein the RF circuit receives the attachment signal and transmits the signal including the RF proximity indication and the attachment signal to a paired device.

Example 34 includes the system of any of examples 31-33, further including a user notification circuit, wherein the user notification circuit is configured to receive the abandonment alert and notify a user of the abandonment alert.

Example 35 includes the system of any of examples 31-35, wherein notifying a user of the abandonment alert includes notifying a user by at least one of sending a text message, sending an e-mail message, flashing a light, generating a vibration, playing a sound, and displaying a warning message.

Example 36 includes the system of example 31, wherein generating the RF proximity indication includes generating an approximate RF distance based on a received signal strength indicator (RSSI).

Example 37 includes the system of example 31, further including an environmental sensor, wherein the environmental sensor generates an environmental measurement representative of an environmental condition, and the device processor is further specifically programmed to receive the environmental measurement, determine that the environmental measurement exceeds a maximum environmental measurement safety threshold, and generate an environment alert, the alert indicating that the removable object is attached to the base and that the environmental condition is unsafe.

Example 38 includes the system of any of examples 31-38, wherein the environmental measurement is at least one of a humidity measurement and a temperature measurement.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A removable object proximity detection system, the system comprising:
 a magnet attached to a removable object;
 a magnetic sensor attached to a base, the magnetic sensor configured to generate a magnetic proximity signal representative of a magnetic proximity between the removable object and the base, the removable object configured to be removably attached to the base;
 a radio frequency (RF) circuit, the RF circuit configured to communicate with a mobile electronic device and to generate an RF proximity indication, the RF proximity indication representative of a device distance between the RF circuit and the mobile electronic device; and
 a device processor electrically coupled to the magnetic sensor and to the RF circuit, the device processor specifically programmed to:
  receive the magnetic proximity signal from the magnetic sensor;
  determine, based on the magnetic proximity signal, that the removable object is attached to the base;
  receive the RF proximity indication from the RF circuit;
  determine, based on the RF proximity indication, that the device distance exceeds a maximum device distance threshold; and
  generate an abandonment alert, the alert indicating that the removable object is attached to the base and that the device distance exceeds the maximum device distance threshold.

2. The system of claim 1, wherein the device processor is further specifically programmed to transmit the abandonment alert to the mobile electronic device via the RF circuit.

3. The system of claim 1, further including an audible alert circuit, wherein the device processor is further specifically programmed to cause the audible alert circuit to generate an audible alert.

4. The system of claim 1, wherein the device processor is further specifically programmed to transmit the abandonment alert to a vehicle alarm system to generate a vehicle alarm.

5. The system of claim 1, wherein the RF proximity indication includes a received signal strength indicator (RSSI).

6. The system of claim 1, further including an environmental sensor, wherein the environmental sensor generates an environmental measurement representative of an environmental condition, and the device processor is further specifically programmed to:
 receive the environmental measurement;
 determine that the environmental measurement exceeds a maximum environmental measurement safety threshold; and
 generate an environment alert, the alert indicating that the removable object is attached to the base and that the environmental condition is unsafe.

7. The system of claim 6, wherein the environmental measurement is at least one of a humidity measurement and a temperature measurement.

8. The system of claim 1, wherein the RF circuit is further configured to communicate based on a wireless communication standard.

9. The system of claim 8, wherein the wireless communication standard is based on at least one of a RILE standard, an IEEE 802.15.1 standard, and an IEEE 802.15.4 standard.

10. The system of claim 1, wherein the magnetic sensor includes a Hall Effect sensor.

11. The system of claim 1, wherein the device processor is a microcontroller.

12. A magnetic proximity detection system, the system comprising:
 a mobile electronic device RF circuit, the RF circuit configured to communicate with a magnetic sensor and to generate an RF proximity indication, the RF proximity indication representative of a device distance between the RF circuit and the magnetic sensor;
 a mobile electronic device processor electrically coupled to the RF circuit, the mobile electronic device configured to execute software specifically programmed to:
  receive a magnetic proximity signal from the magnetic sensor, the magnetic proximity signal representative of a magnetic proximity between a magnet and the magnetic sensor;
  determine, based on the magnetic proximity signal, that the magnet is in close proximity to the magnetic sensor;
  receive the RF proximity indication from the RF circuit;
  determine, based on the RF proximity indication, that the device distance exceeds a maximum device distance threshold; and
  generate an abandonment alert, the alert indicating that the magnet is in close proximity to the magnetic sensor and that the device distance exceeds the maximum device distance threshold.

13. The system of claim 12, further including an audible signal generation circuit, wherein the mobile electronic device processor software is further specifically programmed to cause the audible signal generation circuit to generate an audible alert.

14. The system of claim 12, wherein the mobile electronic device processor software is further specifically programmed to transmit the abandonment alert to a vehicle alarm system to generate a vehicle alarm.

15. The system of claim 12, wherein the RF proximity indication includes a received signal strength indicator (RSSI).

16. The system of claim 12, wherein the mobile electronic device software is further specifically programmed to:
 receive an environmental measurement representative of an environmental condition;
 determine that the environmental measurement exceeds a maximum environmental measurement safety threshold; and
 generate an environment alert, the alert indicating that the magnet is in close proximity to the magnetic sensor and that the environmental condition is unsafe.

17. The system of claim 16, wherein the environmental measurement is at least one of a humidity measurement and a temperature measurement.

18. The system of claim 12, wherein the RF circuit is further configured to communicate based on a wireless communication standard.

19. The system of claim 18, wherein the wireless communication standard is based on at least one of a BTLE standard, an IEEE 802.15.1 standard, and an IEEE 802.15.4 standard.

20. The system of claim 12, wherein the magnetic sensor includes a Hall Effect sensor.

21. A method for removable object proximity detection executing on a specifically programmed device processor, the method including:
generating a magnetic proximity signal representative of a magnetic proximity between a magnetic sensor attached to a base and a magnet attached to a removable object, the removable object configured to be removably attached to the base;
determining, based on the magnetic proximity signal, that the removable object is attached to the base;
generating an RF proximity indication representative of a device distance between an RE circuit and a mobile electronic device;
determining, based on the RF proximity indication, that the device distance exceeds a maximum device distance threshold; and
generating an abandonment alert, the alert indicating that the removable object is attached to the base and that the device distance exceeds the maximum device distance threshold.

22. The method of claim 21, further including transmitting the abandonment alert to the mobile electronic device via the RF circuit.

23. The method of claim 21, further including generating an audible alert via an audible alert circuit.

24. The method of claim 21, further including transmuting the abandonment alert to a vehicle alarm system to generate a vehicle alarm.

25. The method of claim 21, wherein the RF proximity indication includes a received signal strength indicator (RSSI).

26. The method of claim 21, further including:
generating an environmental measurement representative of an environmental condition via an environmental sensor;
determining that the environmental measurement exceeds a maximum environmental measurement safety threshold; and
generating an environment alert, the alert indicating that the removable object is attached to the base and that the environmental condition is unsafe.

27. The method of claim 26, wherein the environmental measurement is at least one of a humidity measurement and a temperature measurement.

28. The method of claim 21, wherein the RF circuit is configured to communicate based on a wireless communication standard.

29. The method of claim 28, wherein the wireless communication standard is based on at least one of a BTLE standard, an IEEE 802.15.1 standard, and an IEEE 802.15.4 standard.

30. The method of claim 21, wherein the magnetic sensor includes a Hall Effect sensor.

31. A removable object proximity detection system, the system comprising:
a magnet attached to a removable object;
a magnetic sensor attached to a base, the magnetic sensor configured to provide an attachment signal representative of an attachment of the removable object to the base;
a radio frequency (RF) circuit, the RF circuit configured to communicate with a mobile electronic device and to generate an RF proximity indication, the RF proximity indication representative of a device distance between the RF circuit and the mobile electronic device and
a device processor electrically coupled to the magnetic sensor, the device processor specifically programmed to:
receive the attachment signal from the magnetic sensor;
determine, based on the attachment signal, that the removable object is attached to the base;
receive the RF proximity indication from the RF circuit;
determine, based on the RF proximity indication, that the device distance exceeds a maximum device distance threshold; and
generate an abandonment alert, the alert indicating that the removable object is attached to the base and that the device distance exceeds the maximum device distance threshold.

32. The system of claim 31 wherein the RF circuit receives the attachment signal and transmits the signal including the RF proximity indication and the attachment signal to a paired device.

33. The system of claim 31, further including a user notification circuit, wherein the user notification circuit is configured to receive the abandonment alert and notify a user of the abandonment alert.

34. The system of claim 33, wherein notifying a user of the abandonment alert includes notifying a user by at least one of sending a text message, sending an e-mail message, flashing a light, generating a vibration, playing a sound, and displaying a warning message.

35. The system of claim 31, wherein generating the RF proximity indication includes generating an approximate RF distance based on a received signal strength indicator (RSSI).

36. The system of claim 31, further including an environmental sensor, wherein the environmental sensor generates an environmental measurement representative of an environmental condition, and the device processor is further specifically programmed to:
receive the environmental measurement;
determine that the environmental measurement exceeds a maximum environmental measurement safety threshold; and
generate an environment alert, the alert indicating that the removable object is attached to the base and that the environmental condition is unsafe.

37. The system of claim 36, wherein the environmental measurement is at least one of a humidity measurement and a temperature measurement.

* * * * *